United States Patent
Fotouhi et al.

(10) Patent No.: US 6,300,820 B1
(45) Date of Patent: Oct. 9, 2001

(54) VOLTAGE REGULATED CHARGE PUMP

(75) Inventors: Bahram Fotouhi, Cupertino; Roubik Gregorian, Saratoga, both of CA (US)

(73) Assignee: Exar Corporation, Fremont, CA (US)

( * ) Notice: Subject to any disclaimer, the term of this patent is extended or adjusted under 35 U.S.C. 154(b) by 0 days.

(21) Appl. No.: 09/498,699

(22) Filed: Feb. 7, 2000

(51) Int. Cl.[7] .................................................. G05F 1/10
(52) U.S. Cl. ........................................................... 327/536
(58) Field of Search .................................. 327/530, 534, 327/535, 536, 540, 541

(56) References Cited

U.S. PATENT DOCUMENTS

| | | | |
|---|---|---|---|
| 4,733,159 | 3/1988 | Edwards | 323/282 |
| 4,897,774 | * 1/1990 | Bingham et al. | 363/61 |
| 5,592,370 | 1/1997 | Rogers | 363/60 |
| 5,726,944 | 3/1998 | Pelley et al. | 365/226 |
| 5,754,417 | * 5/1998 | Nicollini | 363/60 |
| 5,914,632 | * 6/1999 | Fotouhi et al. | 327/537 |
| 5,946,258 | * 8/1999 | Evertt et al. | 365/226 |
| 5,959,854 | 9/1999 | Okada | 363/60 |
| 6,107,862 | * 8/2000 | Mukainakano et al. | 327/536 |

* cited by examiner

*Primary Examiner*—Jeffrey Zweizig
(74) *Attorney, Agent, or Firm*—Kenneth R. Backus, Jr.; Townsend and Townsend and Crew LLP

(57) ABSTRACT

A voltage regulated charge pump is disclosed which is capable of regulating its output voltage without radiating switching noise or consuming more power than is necessary to maintain the output at its targeted level. The voltage regulated charge pump circuit and its method of regulation, according to the present invention, can reliably drive transmission lines in networking system and communication applications.

22 Claims, 4 Drawing Sheets

VOLTAGE REGULATED CHARGE PUMP

BACKGROUND OF THE INVENTION

The present invention relates in general to voltage regulation within integrated circuits (ICs), and in particular to a voltage regulated charge pump.

Many electronic systems require more than a single power supply voltage level for operation. For example, a non-volatile memory circuit that may require 5 volts as a primary source of power, often requires higher voltages (e.g., 10 to 15 volts) for programming and/ or erasing functions. Similarly, communication and networking system circuits often require voltages other than the primary supply voltage to, for example, meet certain interface specifications.

Depending on the power requirements of such secondary supply voltages, it is desirable to generate them internally from the primary power supply. This eliminates the need for additional externally provided power supplies. To this end, voltage multiplying or charge pump circuits have been developed to generate the higher voltages from the primary supply voltage.

Charge pump circuits take advantage of the charge storing capability of capacitors to, for example, double the level of a primary supply voltage by bootstrapping. A typical example of a charge pump circuit for use in communication circuits is disclosed in U.S. Pat. No. 4,797,899. There, a network of switches and capacitors operate to generate voltages twice that of the primary Vdd supply in both positive (+2×Vdd) and negative (−2×Vdd) directions.

In certain applications, such as in networking systems, the secondary voltage ("Vpp") generated by the charge pump is used to drive transmission lines in accordance to specific networking protocol such as V.28 (RS-232), V.35, RS449, EIA-530-A, X.21, etc. When driving transmissions lines under load conditions, current is drawn, and Vpp correspondingly decreases from a pre-determined level, for example, +12 Vdc. Restoring Vpp to its target level has been the focus of two common approaches to regulating charge pump output voltages.

One conventional approach adjusts the frequency controlling charge pump switches used to charge up a reservoir capacitor. In particular, when a decrease in output voltage is sensed by the regulation circuitry, the charge pump control logic responds by increasing the frequency of the charging of the capacitor. The increased rate of capacitor discharge means that more charge is injected into the charge pump's output, thus increasing the Vpp level. Once the output voltage reaches its targeted level under certain load conditions, the frequency decreases to it original clocking rate for Vpp regulation. In the event the output voltage increases beyond its targeted level, the control logic in turn would slow the clocking frequency to permit excess Vpp to bleed down.

A significant drawback to this approach is that the relatively high and variable frequencies associated with the charging and discharging of the reservoir capacitor results in radiated switching noise (i.e., electromagnetic radiation). As semiconductor device dimensions and operating voltage levels decrease, switching noise generated by charge pump regulation, according to this approach, contributes to device malfunction.

Another common approach to charge pump regulation is to use a low-dropout (LDO) linear post-regulator. An LDO regulator generally employs a shunt regulator, such as an NPN transistor, after the generated output voltage, but in parallel with the load. In operation, when there is a decrease in Vpp, due to temperature or load current, the shunting device draws less current than when Vpp is at its targeted level. Since less current is drawn by the shunting device, the voltage drop across the device increases until Vpp is restored to its pre-determined level.

An obvious drawback to this approach is that the output voltage generated must be higher than the actual Vpp used in the application. For example, in an application requiring only 12 Vdc, the charge pump is required to generate a higher secondary voltage, such as 16 Vdc. The additional voltage bolsters Vpp by increasing the voltage drop across the shunting device. Therefore, during normal and lightly loaded conditions (e.g., Vpp at target level), the current drawn by the shunting device (i.e., power dissipation) is unnecessarily wasted. Furthermore, as semiconductor technology advances and transistor dimensions decrease, lower operating voltages are required, for example, to prevent breakdown of gate oxides in CMOS devices. Therefore, generating a higher voltage than is necessary, increases the chance that a semiconductor device will be subject to damaging voltages.

Therefore, there is a need in the art for a circuit and a method for regulating a charge pump output voltage that neither radiates switching noise nor consumes more power than is necessary.

SUMMARY OF THE INVENTION

The present invention provides a voltage regulation circuit and technique for charge pump circuits wherein switching noise and power dissipation are minimized. Accordingly, in one embodiment, the present invention provides a regulated on-chip voltage generator including a charge pump circuit coupled between a voltage source and an intermediate voltage, and configured to generate an output voltage. The voltage regulator circuit has a first input coupled to the output voltage, a second input coupled to a reference voltage generator, and an output coupled to the intermediate voltage. Furthermore, the voltage regulator circuit is configured to modulate the intermediate voltage for regulating the output voltage of the charge pump circuit. The voltage regulator circuit includes a voltage translation circuit configured to receive the output voltage and to output a fraction thereof, a reference voltage configured to provide a reference voltage, and an error amplifier having a first amplifier input coupled to the voltage translation circuit to receive the fraction of output voltage, a second amplifier input coupled to the reference voltage generator, and an amplifier output configured to modulate the intermediate voltage.

A better understanding of the nature and advantages of the present invention may be had with reference to the detailed description and drawings below.

DESCRIPTION OF THE PREFERRED EMBODIMENTS

The following detailed description of specific embodiments, including preferred embodiments, reference the accompanying drawings that form part of this disclosure. The drawings illustrate examples of the embodiments and how to practice the invention. Without departing from the scope of the present invention, other embodiments may be used in place of those shown and described, and such substitutions should be apparent to one of ordinary skill in the art upon reading this disclosure.

Figure 1:
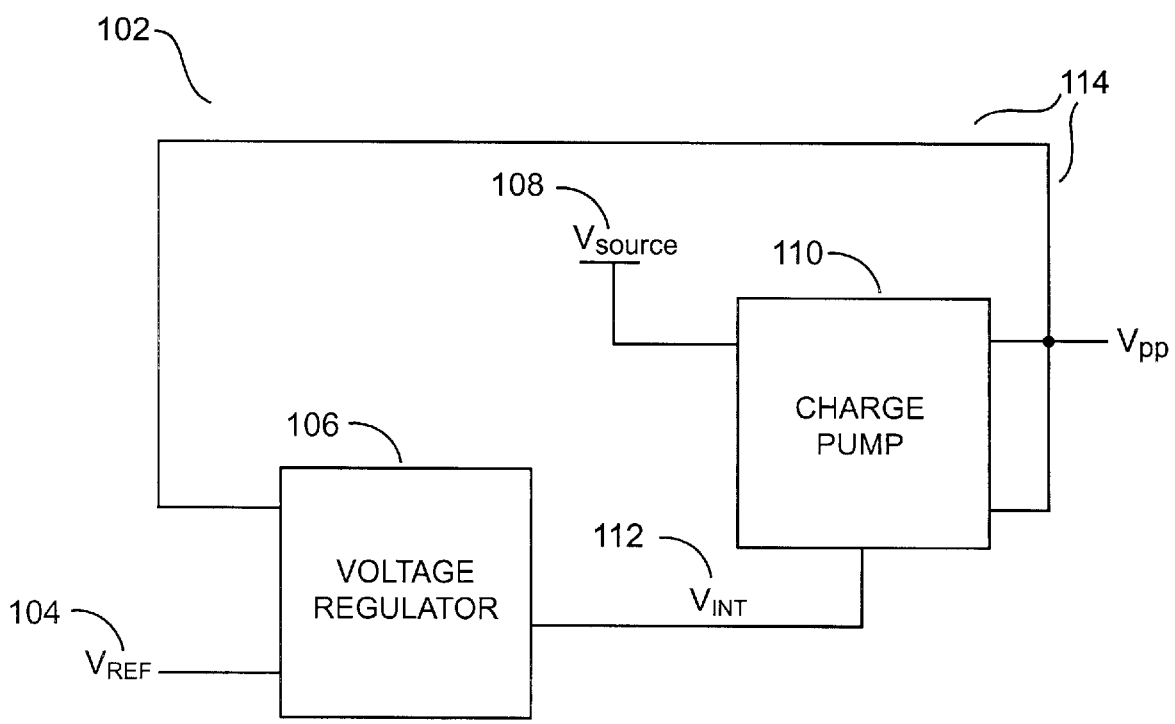
FIG. 1 is a simplified block diagram of an exemplary voltage regulated charge pump.

In the preferred embodiment, a charge pump circuit is regulated to a user-defined output voltage level wherein the voltage regulator controls regulation within the charge pump circuitry. FIG. 1 shows a simplified block diagram of an exemplary embodiment of a voltage regulated charge pump 102 according to the present invention.

The inventive voltage regulated charge pump 102 of FIG. 1 includes a voltage regulator circuit 106 and a charge pump circuit 110. The charge pump 110 employs two voltage sources, such as Vsource 108 and Vint 112, to generate an output voltage, Vpp 114. In this example, Vsource 108 is typically a primary power supply, such as +5 Vdc, and Vint 112 is an intermediate voltage, such as −2 Vdc. The inventive combination also includes a secondary higher voltage of Vpp 114 that is, for example, +12 Vdc. The voltage regulator is electrically coupled to the charge pump for receiving the output voltage, Vpp 114, and for modulating the intermediate voltage level, Vint 112. The voltage regulator is configured further to receive a reference voltage, Vref 104, which is typically set at level to compare fluctuations in charge pump output voltage, Vpp 114. Upon detecting variations of Vpp 114, the voltage regulator circuit 106 adjusts the intermediate voltage level, Vint 112, so internal circuitry which generates Vpp within the charge pump 110 will compensate to correct for such Vpp variations.

In operation, when the output voltage level of the charge pump, Vpp 114, is subject to load conditions (i.e., increased load current), the charge pump output generally decreases. A typical example of a load condition is when the charge pump output is used to charge an external capacitor or to drive a transmission line. The voltage regulator senses the decrease in Vpp 114 and correspondingly functions to help restore Vpp to a pre-determined level by adjusting Vint 112, for example, to a more negative voltage level. In turn, the more negative Vint is used to increase the magnitude of potential difference across a reservoir capacitor. The capacitor functions to store charge within the charge pump's Vpp generating circuitry. The increase in potential difference results in a increase in charge pump output voltage, Vpp. A detailed explanation of the interaction between Vint 112 modulation and the Vpp 114 regulation will be presented below in connection with FIG. 3.

Figure 2:
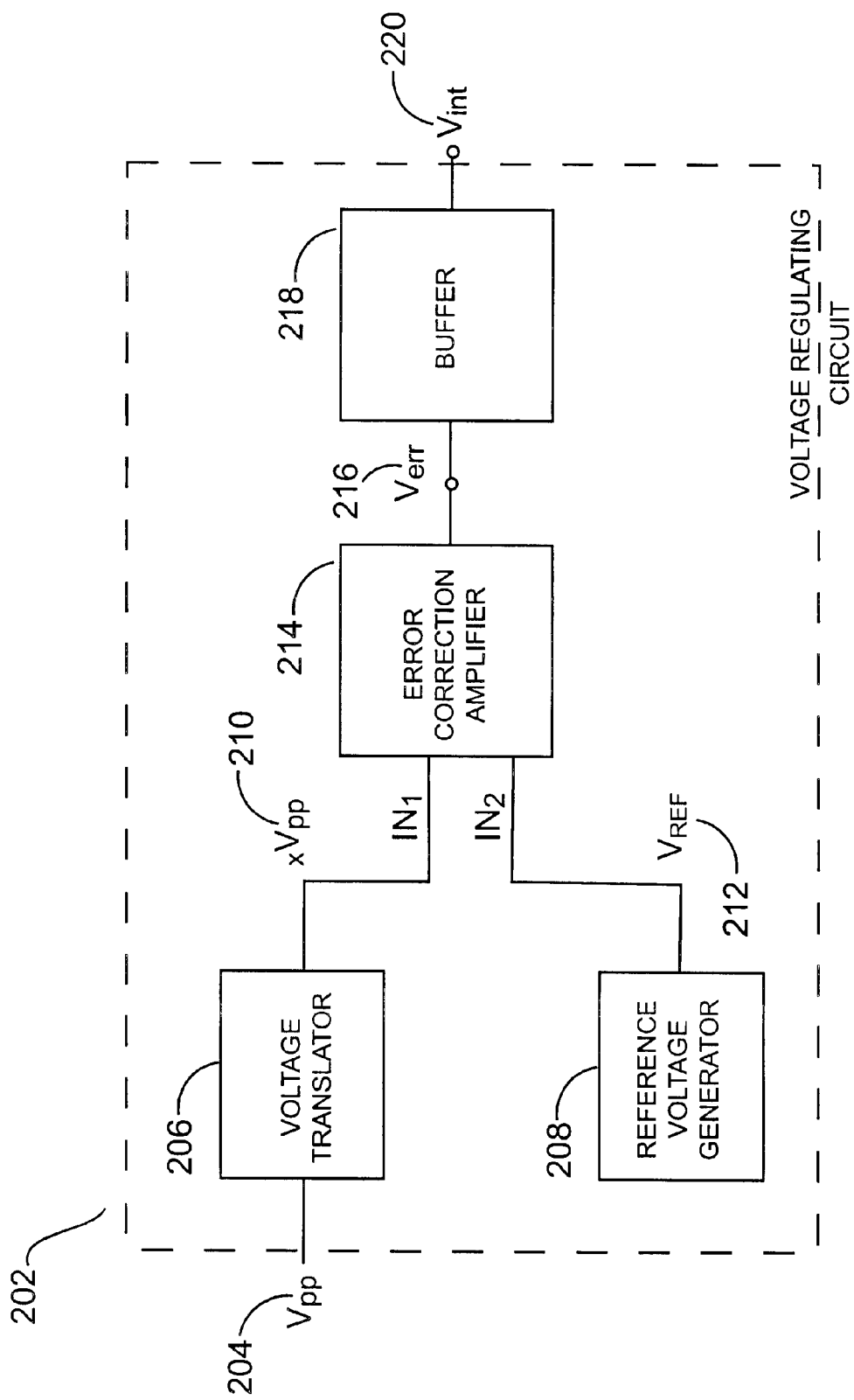
FIG. 2 is a block diagram of an embodiment of a voltage regulating circuit.

FIG. 2 is a block diagram showing an exemplary embodiment for the voltage regulator of the present invention. Voltage regulator circuit 202, for example, includes a voltage translator circuit 206, a reference voltage generator 208, an error amplifier 214, and a buffer 218. Voltage translator circuit 206 is coupled to receive the charge pump output voltage Vpp 204. Once received, translator circuit 206 operates to translate the voltage level to a fraction of Vpp, $\chi$Vpp 210. For example, a Vpp of +12 Vdc directed into voltage translator circuit 206 will yield a fraction (such as $\chi \approx \frac{1}{5}$) of Vpp, where $\chi$Vpp 210 is approximately +2.5 Vdc. Lastly, voltage translator circuit 206 is coupled to provide fraction $\chi$Vpp 210 to a first input, IN1, of an error amplifier 214.

Reference voltage generator 208 is coupled to a second input, IN2, of the error amplifier 214 and provides a reference voltage, such as +2.5 Vdc.

Reference voltage Vref 212 is a fixed, non-variable voltage level designed for use as a yardstick or standard in which to measure the magnitude that the fraction $\chi$Vpp 210 deviates from its user-defined level. Generating a reference voltage is well known in the art and reference voltage generator 208, for example, could include a band-gap voltage reference wherein Vref 212 is stable over temperature, semiconductor process variations, etc.

Error amplifier 214 operates to detect fluctuations in Vpp 204 and to apply an error signal 216 ("Verr") at the output of the error amplifier 214. The error signal 216 is of varying magnitude and is proportional to the amount of regulation required to stabilize the charge pump output voltage to the user-defined Vpp level. The error signal 216 functions to modulate the intermediate voltage level, Vint 220, of the charge pump and thus contributes to regulation.

IN1 and IN2 are coupled to receive and to sample the fraction $\chi$Vpp 210 and Vref 212, respectively. A small difference voltage, or error voltage ("$\Delta$V"), develops across the error amplifier's inputs when $\chi$Vpp 210 deviates from Vref 212 as the output voltage Vpp 204 varies (i.e., ±$\chi$Vpp−Vref×$\Delta$V). The error amplifier 214 samples the difference voltage AV and then outputs a resultant error signal, Verr 216.

In one embodiment, a buffer 218 is coupled between the output of error amplifier 214 and the intermediate voltage level, Vint 220, of the charge pump. The buffer 218 operates to set Vint 220 at a user-defined level and to shield error amplifier 214 from residual currents discharged from the charge pump (e.g., from the reservoir capacitor). In another embodiment, buffer 218 does not act to alter the magnitude of regulation required to restore Vpp. That is, the buffer's gain is near unity such that Verr 216 is approximately equal to Vint 220. In yet another embodiment, the output of error amplifier 214 is coupled directly to the intermediate voltage level to modulate Vint 220 for Vpp regulation within the charge pump. In this bufferless embodiment, the error signal Verr 216 is applied directly to Vint 220 for modulation.

Figure 3:
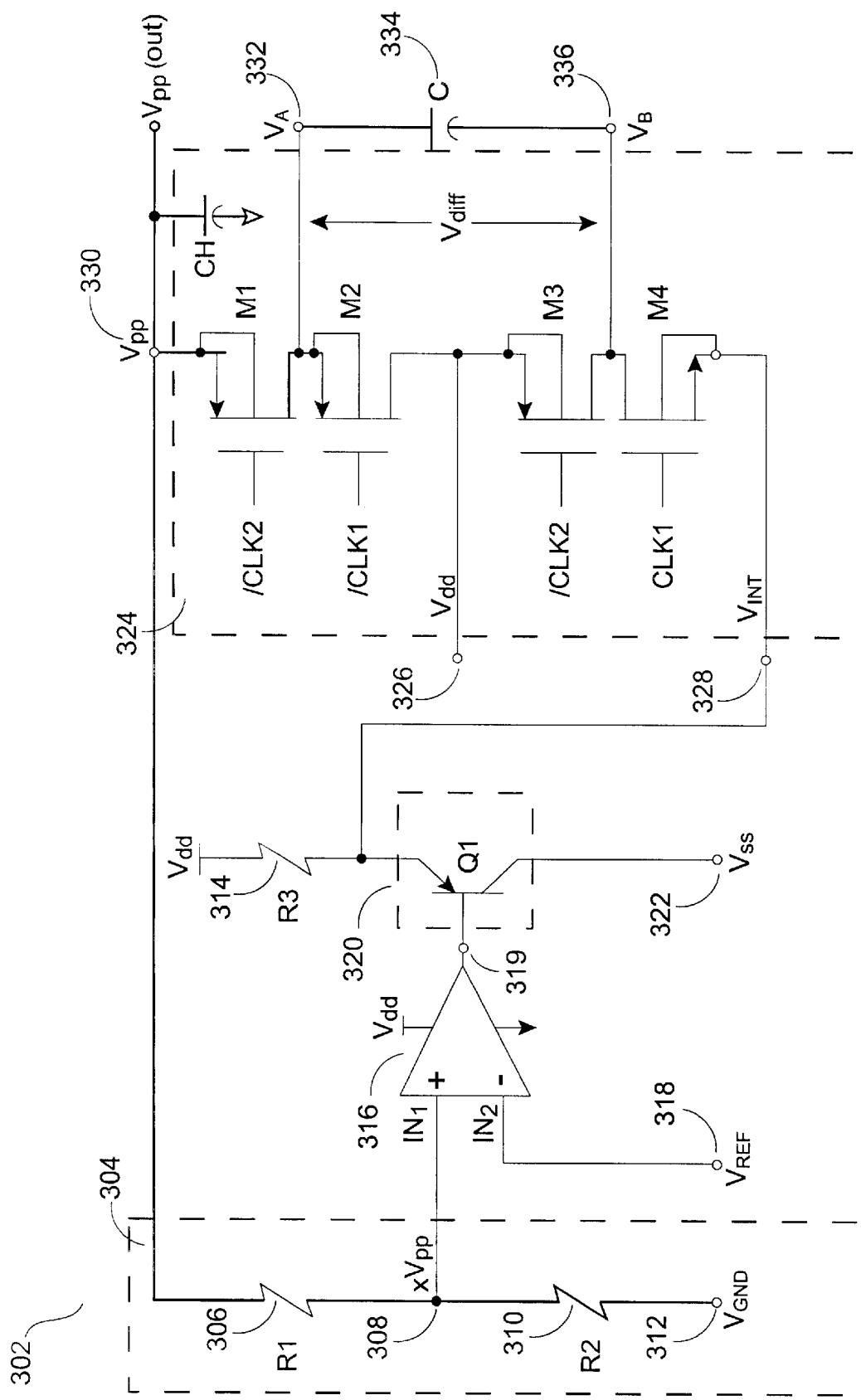
FIG. 3 is a circuit schematic of an exemplary voltage regulated charge pump circuit according to one embodiment of the present invention.

FIG. 3 is a schematic diagram showing a specific embodiment of the present invention and describes an exemplary voltage regulated charge pump 302. In one embodiment, the voltage translator circuit 304 is a voltage divider circuit configured to generate a fraction of Vpp, $\chi$Vpp, at voltage divider node 308. An exemplary voltage translator circuit 308 includes a first resistance element 306 ("R1"), such as a polysilicon or diffusion resistor, coupled between Vpp 330 and the voltage divider node 308. It further includes a second resistance element 310 ("R2") coupled between the voltage divider node 308 and a bias potential 312 equivalent to, for example, electrical ground. The values of RI and R2 are selected in a way such that the potential difference between the voltage divider node 308 and bias potential 312 (i.e., voltage drop across R2) is equivalent to the reference voltage Vref 318 when Vpp is operating at its targeted output level. For example, if RI is selected to be 95 k$\Omega$, then R2 should be selected to be 25 k$\Omega$ so that the voltage drop across R1 is 80% of Vpp and the voltage drop across R2 is 20% of Vpp. Therefore, when Vpp is operating at a targeted level of +12 Vdc, the voltage level at the voltage divider node 308 is approximately +2.5 Vdc.

The voltage reference generator (not shown), such as a band-gap reference, provides a reference voltage at Vref node 318. Vref of the exemplary voltage regulated charge pump 302 is designed to maintain a fixed, non-variable voltage for comparing to the potentially variable voltage drop across R2. For example, Vref is configured to provide a voltage of +2.5 Vdc.

Although other error amplifier circuit embodiments or substitutions may be used in place of those shown and to be described, FIG. 3 depicts an exemplary embodiment of error amplifier that includes an operational amplifier ("op-amp") 316. In another embodiment, op-amp 316 is non-inverting and has two inputs, IN1 and IN2, wherein INi is coupled to voltage divider node 308 to sample the fraction of Vpp, χVpp, and IN2 is coupled to Vref node 318 to sample the reference voltage. As with the block diagram of FIG. 2, a small difference voltage ("ΔV") develops across the op-amp's inputs when χVpp deviates from Vref as output voltage Vpp varies. The op-amp 316 first senses ΔV between its inputs, then amplifies the difference by a factor of Av, and lastly asserts an error signal Verr at its output 319. Av is the open-loop gain of non-inverting op-amp 316 and may have an exemplary value of, e.g., about 1000 such that Vout≈(1000)(Vin1−Vin2).

When Vpp is maintained at its targeted level, fraction χVpp is equal to Vref, and the difference voltage sampled between IN1 and IN2 is zero (i.e., +χVpp−Vref=0 Vdc). The op-amp's output 319 will remain at its defined output voltage such that the intermediate voltage level ("Vint"), remains fixed, for example, at −2 Vdc. When Vint 328 remains stable at a fixed level, the charge pump 324 will regulate to the desired output voltage. However, when Vpp 330 decreases due to, for example, increased load currents, χVpp proportionately decreases to a voltage less than Vref. When this happens, the difference voltage sampled between IN1 and IN2 will be negative (i.e., −χVpp−Vref=−ΔV). The op-amp 316 responds by first amplifying the difference by the op-amp's gain, and then driving op-amp's output 319 to a more negative voltage (i.e., Vout≈(Av)(−ΔV)). In response to −ΔV applied to the op-amp's inputs, Vint 328 will be modulated to a more negative voltage so that the charge pump 324 can function to restore Vpp 330 to its targeted value.

The example of the present invention shown in FIG. 3 also includes a buffer 320 wherein the buffer is, for example, a PNP bipolar transistor in an emitter-follower configuration. As an emitter-follower, the PNP device Q1 has a non-inverting gain with a magnitude of nearly unity. The buffer is coupled to op-amp output 319 so that when a fluctuation in Vpp 330 is detected by op-amp 316, an error signal Verr will be asserted at op-amp output 319. Since Q1 is a non-inverting emitter-follower device with gain of ≈1, then Vint 328 is approximately equal to Verr. Hence, the charge pump compensates by generating an output voltage increased by Verr (i.e., amplified −ΔV) to restore Vpp to its predetermined value. A third resistance element ("R3") 314 is coupled between both buffer 320 and Vint 328, and the output voltage 330. R3 biases buffer 320 such that Vint remains at a fixed level when Vpp 330 needs no regulation.

In yet another embodiment, buffer 320 is coupled between Vint and a supply potential 322, for example, a negative voltage source ("Vss") of −6 Vdc. Vss provides op-amp 316 the ability to modulate Vint from −2 Vdc to approximately −6 Vdc to compensate for varying values of −ΔAV.

In still yet another embodiment, buffer 320 is absent from the present invention and op-amp output 319 is coupled directly to the Vint terminal 328. In a bufferless embodiment, no protection for op-amp 316 is required because minimal and non-damaging currents flow from Vint terminal 328.

The discussion of the present invention shown in FIG. 3 has heretofore described an exemplary voltage regulation circuit for regulating a charge pump. The following description of FIG. 3 relates to the charge pump structure, its operation, and the regulation thereof. The exemplary charge pump 324 is typically configured to generate a higher output voltage from one or more voltage sources having lower magnitudes. The detailed functionality of charge pump 324 is similar to that described in commonly assigned U.S. Pat. No. 5,914,632 ("Negative Charge Pump Circuit"), which is hereby incorporated by reference.

In the example of a voltage regulated charge pump 302, as shown in FIG. 3, the voltage regulation circuitry is coupled to the charge pump 324 at Vpp terminal 330 and at Vint terminal 328. Charge pump 324 is also coupled to a voltage source 326 (not shown) at voltage source terminal 326, wherein the voltage source, for example, is a positive voltage source ("Vdd") of +5 Vdc.

An exemplary circuit implementation for charge pump 324 is depicted in FIG. 3. Coupled between charge pump output voltage 330 and the voltage source terminal 326 is a pair of transistors, M1 and M2. Another pair of transistors, M3 and M4, are coupled between the voltage source terminal 326, Vdd, and the intermediate voltage level terminal 322, Vint. Furthermore, an electrical conductor is coupled from between M1 and M2 to VA at node 332. Likewise, an electrical conductor is coupled from between M3 and M4 to VB at node 334. In one embodiment, an external capacitor (i.e., reservoir capacitor) is coupled between VA and VB, and functions to store charge temporarily, before the stored charge can be enhanced and outputted to the charge pump's output 330. A holding capacitor CH couples node 330 (Vpp) to ground. Charge from capacitor C 334 is dumped onto capacitor CH as the potential at node 330 Vpp rises. Lastly, devices M1, M2, M3 and M4 are all driven by one or more clock signals (CLK1 and CLK2) wherein in the clock signals are used to control the above mentioned devices for Vpp generation.

To generate Vpp 330, elementary charge pump 324 is clocked through different phases. During phase one, devices M2 and M4 are active (i.e., M1 and M3 are inactive) allowing VB to charge to the intermediate voltage level of, for example, about −2 V at terminal 328, Vint. During phase one, VA is also charged to Vdd, the voltage source's potential, e.g., +5 V. At the end of phase one, capacitor 334 is charged to, e.g., +7 V, that is, the potential difference ("Vdiff") between VA and VB is +7 V (i.e., +5 V−(−2 V) is +7 V). During phase two, device M1 and M3 are activated (i.e., M2, and M4 are inactive). M3 activation enhances Vdiff by level shifting VB by Vdd. More specifically, a Vdd of +5 Vdc is added to a Vdiff of +7 Vdc, thus charging capacitor CH to +12 Vdc. M1 activation drives the +12 Vdc from the charge pump output to generate Vpp 330. Returning to phase one, device M4 again charges VB to Vint, wherein Vint is either: (1) approximately −2 Vdc if Vpp +12 Vdc, or, (2) modulated to regulate the charge pump if Vpp ≠+2 Vdc.

Therefore, the inventive apparatus and method of the present invention regulates charge pump 324 by modulating the intermediate voltage level at terminal 328, Vint, if the voltage regulating circuit detects a deviation in Vpp 330 from its target level. For example, when no voltage differential exists between IN1 and IN2 (i.e., ΔV≈0 Vdc), op-amp output 319 remains at a fixed Vint, such as −2.0 Vdc. As the charge pump clocks though its Vpp generation cycles to phase two, Vdiff remains at +7 Vdc, since Vpp is at its target level and requires no regulation (i.e., VB need only be charged to −2.0 Vdc).

However, if the output voltage of the charge pump decreases below the target level, then a voltage differential will exist between IN1 and IN2. For example, when a decreased Vpp causes a difference voltage of≈−3 mV to exist between IN1 and IN2. Op-amp 316, with Av of, e.g., 1000, responds to the ΔV by asserting an error signal, Verr, of≈−3.0 V at op-amp output 319. In an embodiment where op-amp 316 is coupled to buffer 320, Verr is essentially Vint when internal voltage drops (e.g., Vbe) within bipolar device Q1 are ignored. Vint then is modulated from −2.0 Vdc to −3.0 Vdc by op-amp 319. The modulated Vint is used by the charge pump, for example, during its phase two cycle to increase Vdiff to approximately +8.0 Vdc (i.e., +5 V−(−3 V) is +8 V). Thus, at the end of the phase two cycle, more charge is dumped (equivalent to Vpp ≈+13 Vdc) onto the charge pump output. Hence, the charge pump output voltage is regulated to its user defined level of Vpp 330. Lastly, when the charge pump output increases (i.e., Vpp >target level), an opposite action occurs similar to the above described situation.

Figure 4:
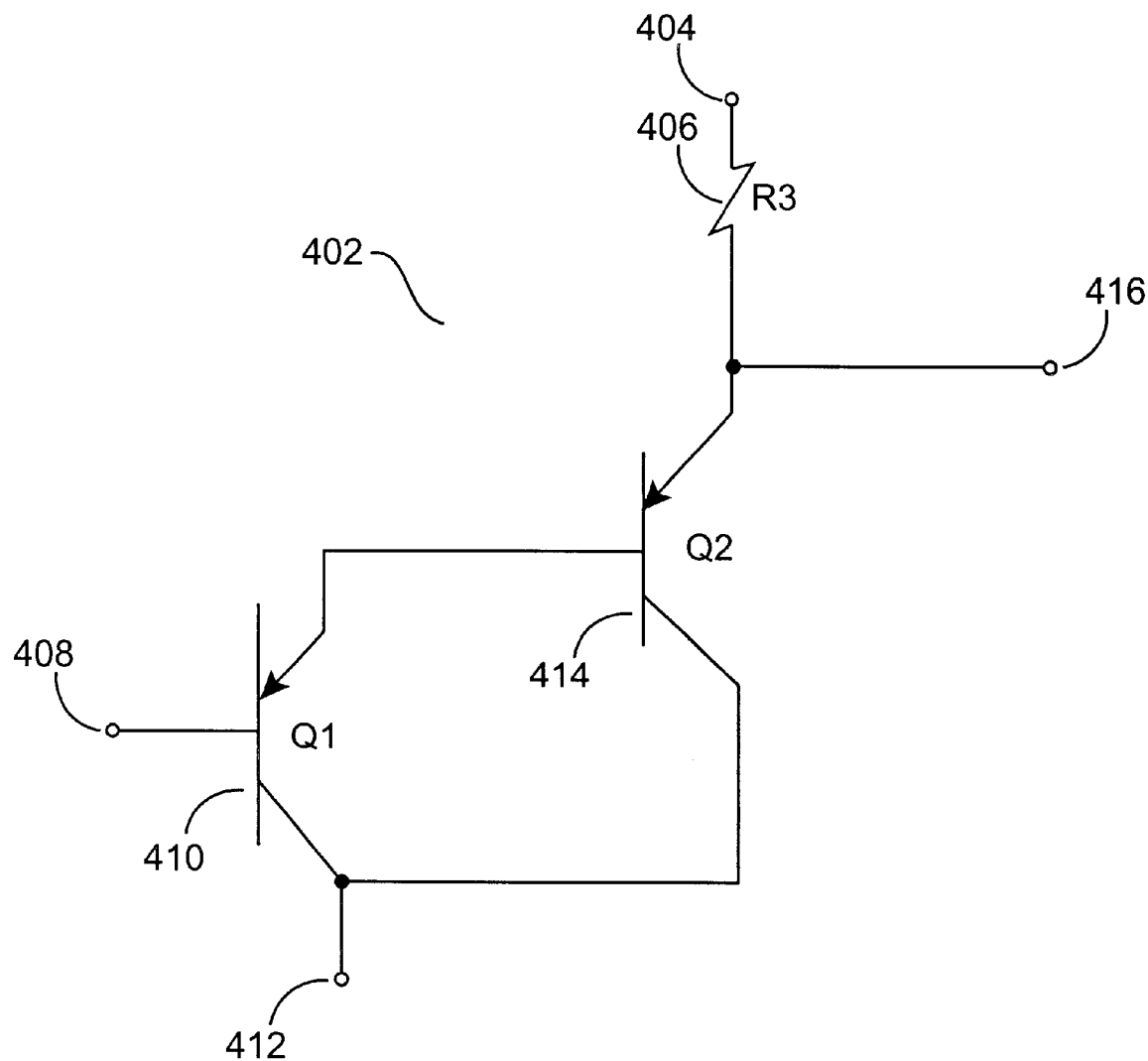
FIG. 4 is a circuit schematic of a darlington transistor pair as another embodiment of the buffer circuit of FIG. 3.

FIG. 4 shows another embodiment of the present invention, wherein buffer 320 of FIG. 3 includes a darlington pair 402. For example, a first bipolar transistor Q1 410 (e.g., a PNP device), is coupled to op-amp output 319 at Q1 base 408. The collector of Q1 is coupled to both the collector of a second bipolar transistor Q2 414 (e.g., another PNP device), and a supply potential (e.g., Vss) at node 412. The emitter of Q1 is coupled to the base of Q2, and the emitter of Q2 is coupled to both R3 406 and Vint at node 416. In turn, biasing resistance R3 is coupled between Vdd at node 404, and Vint at node 416.

Darlington pair 402 operates to buffer op-amp 316 from potentially damaging currents from the Vint node 416, similar to buffer 320 in FIG. 3. However, configuring bipolar transistors Q1 and Q2 in darlington pair 402 further decreases the operating current entering op-amp output 319 (i.e., increases protection) such that the base current is proportional to the emitter current divided by $\beta^2$, where Ie≈$\beta^2$Ib. Furthermore, the increased input impedance of the darlington pair 402 causes the gain to move closer to unity.

In summary, a novel voltage regulated charge pump apparatus and method has been invented and is described herein. That voltage regulation charge pump approach neither radiates switching noise nor consumes more power than is necessary.

The above description is illustrative and not restrictive. Many variations of the invention will become apparent to those of skill in the art upon review of this disclosure. For example, the operational amplifier can be configured as an inverting amplifier with the corresponding Vref and bipolar device (i.e., NPN transistors instead of PNPs) configured appropriately. Additionally, the charge pump can deliver either a positive Vpp or a negative Vpp, with Vsource, Vss, Vint, and Vref configured for either polarity. Furthermore, Vint can be configured to deliver a variable output voltage Vpp in certain applications. Vpp in such configurations thus would be programmable. The scope of the invention should, therefore, be determined not with reference to the above description, but instead should be determined with reference to the appended claims along with their full scope of equivalents.

What is claimed is:

1. A regulated on-chip voltage generator comprising:
   a charge pump circuit coupled between a voltage source and an intermediate node having an intermediate voltage, and configured to generate an output voltage at an output node, the charge pump circuit having a first transistor switch coupled between the intermediate node and a first terminal of a capacitor and a second transistor switch coupled between a second terminal of the capacitor and the output node; and
   a voltage regulator circuit having a first input coupled to the output voltage, a second input coupled to a reference voltage generator, and an output coupled to the intermediate voltage,
   wherein, the voltage regulator circuit is configured to modulate the intermediate voltage for regulating the output voltage within the charge pump circuit.

2. The generator of claim 1, the charge pump circuit further comprising:
   a third transistor switch coupled between the first terminal of the capacitor and the voltage source; and
   a fourth transistor switch coupled between and the second terminal of the capacitor and the voltage source.

3. The regulated on-chip voltage generator of claim 1, wherein the voltage regulator circuit comprises:
   a voltage translation circuit configured to receive the output voltage and to output a fraction thereof;
   a reference voltage configured to provide a reference voltage; and
   an error amplifier having a first amplifier input coupled to the voltage translation circuit to receive the fraction of output voltage, a second amplifier input coupled to the reference voltage generator, and an amplifier output configured to modulate the intermediate voltage.

4. The regulated on-chip voltage generator of claim 3, further comprising:
   a buffer circuit coupled to the amplifier output and configured to modulate the intermediate voltage.

5. The regulated on-chip voltage generator of claim 3, wherein the voltage translator comprises:
   a voltage dividing network configured to provide a fraction of the output voltage.

6. The regulated on-chip voltage generator of claim 5, wherein the voltage dividing network further comprises:
   a voltage divider node;
   a first resistance element coupled between the output voltage and the voltage divider node; and
   a second resistance element coupled between the voltage divider node and a bias voltage.

7. The regulated on-chip voltage generator of claim 6, wherein the bias voltage is electrical ground.

8. The regulated on-chip voltage generator of claim 3, wherein the voltage reference generator is a band-gap voltage reference.

9. The regulated on-chip voltage generator of claim 3, wherein the error amplifier is an operational amplifier.

10. The regulated on-chip voltage generator of claim 9, wherein the operational amplifier is non-inverting.

11. The regulated on-chip voltage generator of claim 4, wherein the buffer comprises a bipolar transistor having an emitter terminal coupled to the intermediate voltage, a base terminal coupled to the amplifier output and a collector terminal coupled to a supply voltage.

12. The regulated on-chip voltage generator of claim 11, wherein the bipolar transistor is a PNP device configured as a emitter-follower.

13. The regulated on-chip voltage generator of claim 11, wherein the supply voltage is at electrical ground.

14. The regulated on-chip voltage generator of claim 11, wherein the supply voltage is a negative voltage source.

15. The regulated on-chip voltage generator of claim 4, wherein the buffer comprises two or more bipolar transistors configured to operate as a Darlington transistor.

16. The regulated on-chip voltage generator of claim 14, wherein the two or more bipolar transistors are PNP devices.

17. The regulated on-chip voltage generator of claim 15, the Darlington transistor comprising a first transistor having a first base, a first emitter, and a first collector, and a second transistor having a second base, a second emitter, and a second collector, wherein the first base is coupled to the amplifier output;

the first collector is coupled to both the second collector and the supply voltage;

the first emitter is coupled to the second base; and the second emitter is coupled to the intermediate voltage.

18. A voltage regulated charge pump fabricated on a semiconductor substrate, comprising:

a charge pump circuit having an output and an intermediate voltage level at an intermediate node;

a voltage translator circuit configured to receive and to translate an output voltage from the charge pump output into a fraction thereof;

a reference voltage generator for providing a constant reference voltage, where the constant reference voltage remains substantially constant over each phase of the charge pump;

an error amplifier configured to compare the fraction of the output voltage to the reference voltage, the amplifier having a first input coupled to receive the fraction of the output voltage and a second input coupled to receive the constant reference voltage, and an output; and a buffer circuit coupled between the error amplifier output and the intermediate node, wherein a voltage at the intermediate node is modulated in response to an output of the buffer circuit to regulate the output voltage of the charge pump.

19. A method for regulating an output voltage from a charge pump fabricated on a semiconductor substrate, comprising the steps of:

generating the output voltage according to the method of:

transferring charge from a supply voltage source through a first transistor to a first terminal of a capacitor; and transferring charge from a second terminal of the capacitor through a second transistor to an intermediate voltage node having an intermediate voltage;

receiving the output voltage from the charge pump;

generating a fraction of the output voltage;

sampling the fraction of the output voltage;

detecting a deviation of the fraction of the output voltage from a reference voltage, and generating an error signal;

modulating a signal on the intermediate voltage node in response to the error signal; and feeding back the modulated signal to the charge pump, wherein the modulated signal is used by the charge pump to regulate the output voltage of the charge pump.

20. The method of claim 19, further comprising:

transferring charge from the supply voltage source through a third transistor during a next period of time to the second terminal of the capacitor; and transferring charge from the first terminal of the capacitor through a fourth transistor during the next period of time to provide the output voltage.

21. The method of claim 19, wherein the step of generating a fraction of the output voltage further comprises the step of dividing the output voltage within a voltage divider circuit.

22. The method of claim 19, wherein the step of generating a fraction of the output voltage further comprises the step of dividing the output voltage within a voltage divider circuit.

* * * * *